United States Patent Office 3,439,749
Patented Apr. 22, 1969

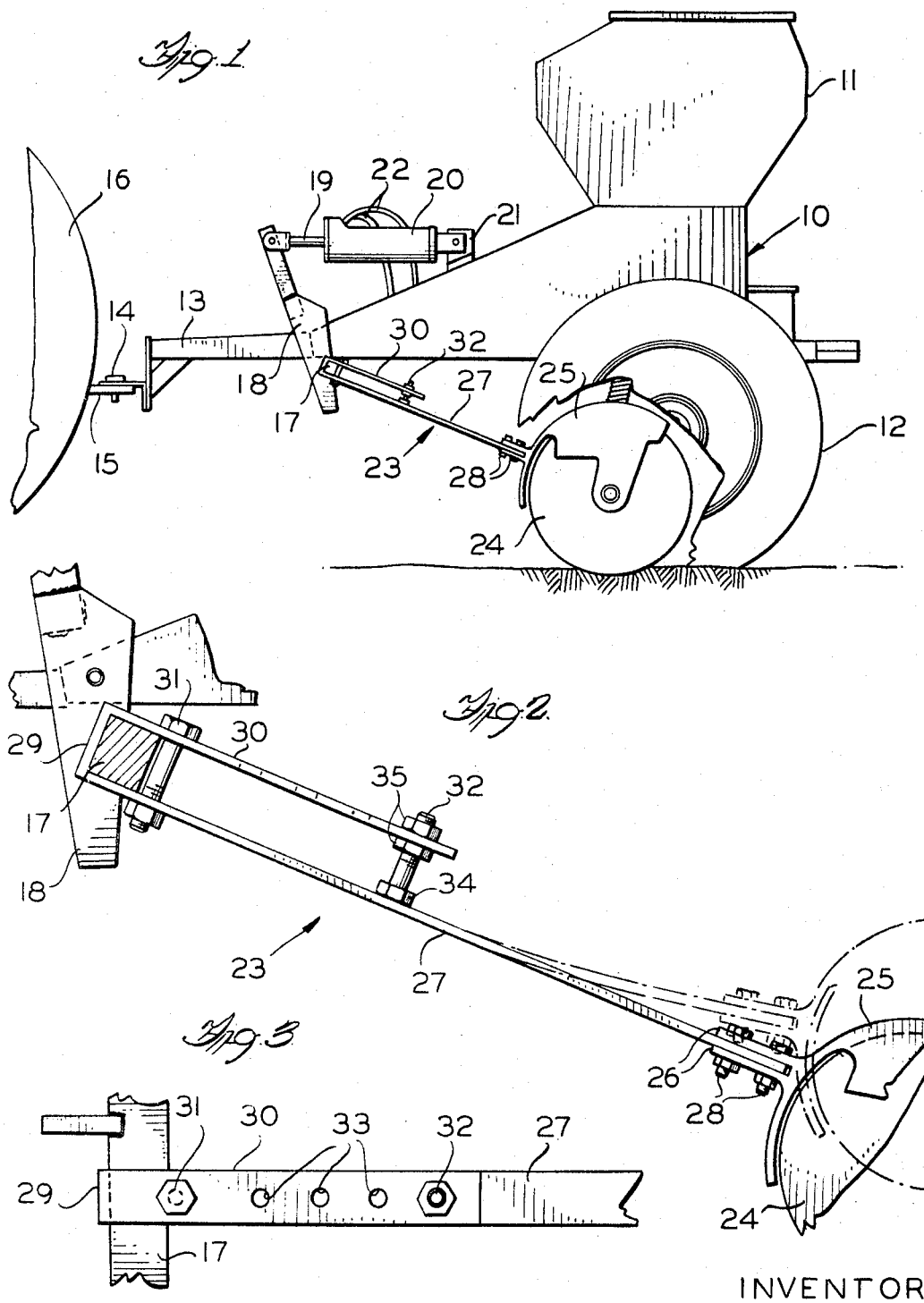

3,439,749
DRAWBAR CONSTRUCTION FOR
FURROW OPENER
Nils O. Olsson, Ancaster, Ontario, Canada, assignor to International Harvester Company, Chicago, Ill., a corporation of New Jersey
Filed Oct. 22, 1965, Ser. No. 501,999
Int. Cl. A01b 21/08, 5/04, 23/04
U.S. Cl. 172—572          3 Claims

ABSTRACT OF THE DISCLOSURE

A flexible draft link for a furrow opener wherein economical and efficient means are provided for varying the down pressure exerted on the furrow opener to cause it to penetrate to the desired depth under different soil conditions.

---

This invention relates to agricultural implements and particularly to earth-working devices. More specifically, the invention concerns a novel draft link or drawbar construction for the furrow openers of grain drills and the like.

An object of this invention is the provision of a novel drawbar for connecting an earth-working tool to a carrier frame.

Another object of the invention is the provision of a novel drawbar for connecting an earth-working tool such as a furrow opener to a lifting shaft, wherein means are inherent in the drawbar for urging the furrow opener into the ground, and the mounting of the drawbar on the implement frame includes means for adjusting the down pressure on the furrow opener.

Other objects and advantages of the invention will become clear from the following detailed description when read in conjunction with the accompanying drawings wherein:

FIGURE 1 is a view in side elevation, partly in section and with parts removed, of the rear end of a tractor having connected thereto a grain drill embodying the features of this invention;

FIGURE 2 is an enlarged sectional view of a portion of the structure shown in FIGURE 1, and FIGURE 3 is a plan view of a portion of the structure shown in FIGURE 2.

In the drawings, the numeral 10 designates the supporting frame of a grain drill of any well known construction carrying a seed hopper 11 and a pair of wheels 12, only one of which is shown. Frame 10 includes a hitch portion 13 connected by a pivot pin 14 to the drawbar 15 of a tractor 16.

A transversely extending shaft 17 is rockably mounted on the implement frame 10, and has secured thereto an arm 18, to the upper end of which is connected a piston rod 19 slidable in a hydraulic cylinder 20 anchored to a lug 21 on frame 10, the cylinder being supplied with fluid under pressure through hose lines 22 from a source of fluid under pressure, not shown, provided by the tractor 16.

Transverse shaft 17 is adapted for the mounting thereon of a plurality of furrow opening units 23, each of which comprises a furrow forming disk structure 24 carried by a furrow opener boot 25 having affixed to and projecting forwardly therefrom a pair of ears 26 between which is received the rear end of a draft bar 27, secured thereto by bolts 28.

Draft member or drawbar 27 is inherently flexible in a vertical plane and is made of a bar of spring steel bent backwardly at its forward end upon itself to form a bight portion 29 to receive the shaft 17 and a rearwardly projecting part 30 generally parallel to the tool-carrying section 27. The drawbar is secured to the shaft 17 by a bolt 31.

The rockshaft 17 is held in a selected position by the hydraulic cylinder 20 and is rocked about its axis to raise and lower the furrow opener units 23 by extension and retraction of piston rod 19 in the cylinder 20.

The draft bar 27 is inherently flexible in a vertical plane and normally urges the furrow disks 24 downwardly into the ground. Upward movement of the disks 24 in response to changes in ground contour is illustrated in dotted lines in FIGURE 2. The degree of flexibility of the drawbar and the down pressure exerted on the earth-working disks 24 is regulated by a stop bolt 32 selectively received in one of a plurality of openings 33 provided in the part 30, bolt 32 having a head 34 engageable with the upper surface of the bar 27, and adjustable perpendicularly to the bar 27 by the provision of nuts 35, by which the bolt is also held in its adjusted position. By assembling the bolt 32 at different locations along the part 30 in one of the openings 33, the downward pressure on the furrow opener can be varied. The greatest down pressure is applied, and the least upward yielding of the disks 24 is accommodated when bolt 32 is disposed in the position shown in the drawings nearest the tool. Conversely, the least down pressure is exerted and the greater flexibility is provided when bolt 32 is disposed in the forwardmost of the openings 33.

It should be clear from the foregoing that a simple and economical furrow opener assembly has been provided for a grain drill that is easily adjusted and easily attached to the supporting frame. It should likewise be understood that the invention has been described in its preferred embodiment and that modifications may be made therein without departing from the spirit of the invention or the scope of the appended claims.

I claim:
1. Means of supporting an earth-working tool from a carrier frame in draft receiving relation comprising, a support, an elongated draft member mounted at its forward end on the support and connected at its rear end to the earth-working tool and extending in a generally straight line therebetween, said draft member being inherently flexible in a vertical plane to urge the tool downwardly and yieldable to accommodate upward movement of the tool in response to changes in ground contour, the mounting of the draft member on the carrier frame including means engageable with said draft member at selected locations between its ends to vary the effective length of said flexible draft member and therefore the down pressure on said earth-working tool and comprising a part secured to the frame and extending rearwardly therefrom generally parallel to said draft member and carrying a stop element independent of and engageable with said draft member medially of its ends.

2. The invention set forth in claim 1, wherein said part is an extension of the forward end of said draft member, the latter being bent backwardly upon itself and carrying a bolt engageable with the main body of the draft member and adjustable perpendicularly thereto.

3. The invention set forth in claim 2, wherein said extension part is provided with a plurality of openings to receive said bolt for engagement with the draft member at selected locations lengthwise thereof.

References Cited

UNITED STATES PATENTS 2,364,666  12/1944  Seaman _____ 172—544

FOREIGN PATENTS 42,417  6/1930  Denmark.
492,978  4/1954  Italy.

ABRAHAM G. STONE, *Primary Examiner.*
RONALD C. HARRINGTON, *Assistant Examiner.*

U.S. Cl. X.R.

172—707